US011252261B2

(12) United States Patent
Dumaine (10) Patent No.: US 11,252,261 B2
(45) Date of Patent: Feb. 15, 2022

(54) SYSTEM AND METHOD FOR ANALYZING WEB APPLICATION NETWORK PERFORMANCE

(71) Applicant: Genesys Telecommunications Laboratories, Inc., Daly City, CA (US)

(72) Inventor: Alexander G. Dumaine, Durham, NC (US)

(*) Notice: Subject to any disclaimer, the term of this patent is extended or adjusted under 35 U.S.C. 154(b) by 0 days.

(21) Appl. No.: 16/849,248

(22) Filed: Apr. 15, 2020

(65) Prior Publication Data

US 2020/0336567 A1   Oct. 22, 2020

Related U.S. Application Data

(60) Provisional application No. 62/835,656, filed on Apr. 18, 2019.

(51) Int. Cl.
*H04L 29/08* (2006.01)

(52) U.S. Cl.
CPC ............. *H04L 67/36* (2013.01); *H04L 67/02* (2013.01)

(58) Field of Classification Search
CPC ................................ H04L 67/36; H04L 67/02
See application file for complete search history.

(56) References Cited

U.S. PATENT DOCUMENTS

| | | | | |
|---|---|---|---|---|
| 7,698,398 B1* | 4/2010 | Lai | ........................ | G06Q 10/10 709/223 |
| 7,774,456 B1* | 8/2010 | Lownsbrough | ..... | H04L 41/5083 709/224 |
| 7,853,643 B1* | 12/2010 | Martinez | ................. | H04L 69/22 709/203 |
| 9,065,969 B2* | 6/2015 | Johnston | ............... | H04L 65/608 |
| 9,363,133 B2* | 6/2016 | Yoakum | ............ | H04L 29/08054 |
| 9,614,890 B2* | 4/2017 | Waxman | ............. | H04L 65/1006 |
| 9,912,705 B2* | 3/2018 | Ezell | ........................ | H04L 67/02 |
| 2011/0131335 A1* | 6/2011 | Spaltro | ................. | G06F 9/5072 709/228 |
| 2013/0018960 A1* | 1/2013 | Knysz | .................... | H04L 65/403 709/204 |
| 2014/0219167 A1* | 8/2014 | Santhanam | ....... | H04W 28/0268 370/328 |
| 2014/0278951 A1* | 9/2014 | O'Connor | .......... | G06Q 30/0251 705/14.49 |

(Continued)

OTHER PUBLICATIONS

PCT International Search Report regarding co-pending application No. PCT/US2020/028258 dated Jul. 15, 2020.

(Continued)

*Primary Examiner* — Blake J Rubin (57) ABSTRACT

A system and method are presented for analyzing network performance of a web application. A user interface in a cloud-based collaboration platform provides a notification when the user's location is having network connectivity issues to the collaboration platform. Connectivity issues may be determined through aggregation of measurements of network quality and performance (e.g. XMLHttpRequest requests, Websockets, and WebRTC) and alerting the user when issues arise. Data may be pushed back to an analytics ingestion system for aggregate-of-aggregate analytics and alerting as well as viewing network performance across a plurality of users and organizations.

20 Claims, 3 Drawing Sheets

(56) References Cited

U.S. PATENT DOCUMENTS

| | | | | |
|---|---|---|---|---|
| 2014/0280995 | A1* | 9/2014 | Ezell | H04L 65/103 709/229 |
| 2015/0039687 | A1* | 2/2015 | Waxman | H04L 65/1006 709/204 |
| 2015/0046985 | A1* | 2/2015 | D'Souza | H04L 63/08 726/4 |
| 2015/0180748 | A1* | 6/2015 | Ding | H04L 67/42 709/224 |
| 2015/0180963 | A1* | 6/2015 | Luecke | H04L 67/327 709/203 |
| 2015/0331578 | A1* | 11/2015 | Keslin | G06F 3/04817 715/751 |
| 2016/0028790 | A1* | 1/2016 | Eriksson | H04L 65/608 709/219 |
| 2016/0099984 | A1* | 4/2016 | Karagiannis | H04L 65/1083 709/206 |
| 2016/0164761 | A1* | 6/2016 | Sathyanarayana | H04L 65/4084 709/219 |
| 2016/0246769 | A1* | 8/2016 | Screen | G06F 3/0481 |
| 2017/0123751 | A1* | 5/2017 | Sson | G06F 3/0481 |
| 2017/0230191 | A1* | 8/2017 | Cuzzort | H04L 67/42 |
| 2018/0191832 | A1* | 7/2018 | Gero | H04L 65/403 |
| 2020/0127940 | A1* | 4/2020 | Fernandez | H04L 47/805 |
| 2020/0285533 | A1* | 9/2020 | Subhedar | G06F 16/252 |

OTHER PUBLICATIONS

PCT International Preliminary Report on Patentability regarding co-pending application No. PCT/US2020/028258 dated Apr. 9, 2021.

\* cited by examiner

SYSTEM AND METHOD FOR ANALYZING WEB APPLICATION NETWORK PERFORMANCE

CLAIM OF PRIORITY TO RELATED APPLICATIONS

This application claims priority and claims the benefit of U.S. Provisional Patent Application 62/835,656, titled "SYSTEM AND METHOD FOR DISTRIBUTED AGGREGATION AND ANALYTICS OF NETWORK INTERFACE ANALYTICS IN WEB APPLICATIONS", filed on Apr. 18, 2019, the specification of which is hereby incorporated herein by reference.

BACKGROUND

The present invention generally relates to cloud-based collaboration platforms. More particularly, but not by way of limitation, the present invention pertains to systems and methods for analyzing web application network performance within a cloud-based collaboration platform.

BRIEF DESCRIPTION OF THE INVENTION

A system and method are presented for analyzing network performance of a web application. A user interface in a cloud-based collaboration platform provides a notification when the user's location is having network connectivity issues to the collaboration platform. Connectivity issues may be determined through aggregation of measurements of network quality and performance (e.g. XMLHttpRequest requests, Websockets, and WebRTC) and alerting the user when issues arise. Data may be pushed back to an analytics ingestion system for aggregate-of-aggregate analytics and alerting as well as viewing network performance across a plurality of users and organizations.

In an embodiment, a computer-implemented method is presented for assessing connection quality for a first party in an interaction between the first party and a second party in a cloud-based collaboration platform, the method comprising the steps of: measuring web application network performance across a plurality of network connections between a central client and a plurality of endpoints to obtain a measurement for each network connection; aggregating the measurements obtained and analyzing for an issue; and alerting the first party in real-time if an issue is detected.

The method may additionally include the steps of pushing data to an analytics ingestion system for aggregate-of-aggregate analytics and alerting; and compiling analysis of network performance across users and organizations.

The plurality of network connections comprise different connection types. Measuring is performed using web telemetry.

The measuring further comprises analytics of at least two of: XMLHttpRequests, Websockets, and WebRTC. The XMLHttpRequests are monitored for at least one of: latency in response time as a function of request body size and response body size; and status codes. The Web sockets are monitored for frequent closures, wherein the closures are determined to be indicative of socket connection disruption. Web telemetry is performed of TCP connections performed in a browser via the Websockets for measuring at least one of: network quality, network connectivity, and network stability. The WebRTC is monitored for one or more of: prior to connection, latency in gathering ICE candidates; after the connection, media statistics for latency, bandwidth usage and availability, jitter, and dropped packets; connection interruptions; and connection terminations. Built-in network metrics and RTCPeerConnection are used to determine metrics for monitoring.

In another embodiment, a system is presented for assessing connection quality for a first party in an interaction between the first party and a second party in a cloud-based collaboration platform comprising: a processor; and a memory in communication with the processor, the memory storing instructions that, when executed by the processor causes the processor to assess connection quality by: measure web application network performance across a plurality of network connections between a central client and a plurality of endpoints to obtain a measurement for each network connection; aggregate the measurements obtained and analyzing for an issue; and alert the first party in real-time if an issue is detected.

The plurality of network connections comprise different connection types. The obtained measurements comprise analytics of at least two of: XMLHttpRequests, Web sockets, and WebRTC. The network performance is measured using web telemetry.

The memory stores additional instructions that, when executed by the processor further cause the processor to: push data to an analytics ingestion system for aggregate-of-aggregate analytics and alerting; and compile analysis of network performance across users and organizations.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects. In each case, the example embodiment may be generally referred to as a "module" or "system" or "method". Further, example embodiments may take the form of a computer program product embodied in any tangible medium of expression having computer-usable program code embodied in the medium.

It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which comprises one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In interactions between agents (or a first party) and customers (or a second party) in a contact center or enterprise environment, an agent utilizing a cloud-based collaboration platform can experience network connectivity issues. Poor connections can prevent successful interactions. A caller's ability to successfully hear and respond to an agent on a voice communication is a core aspect of customer perception for a contact center's effectiveness and quality. Users can become frustrated and this can result in a significantly affected outcome. By adding the availability for an agent to understand connection quality, the likelihood of accepting interactions which may not be successful or dropped (as a call would be) is reduced.

As an agent utilizing the cloud-based collaboration platform, it would be beneficial for the agent interface to provide a notification of when the agent's location is experiencing network connectivity issues to the platform service. The indication might be a visual marker to explain possible audio and video quality issues. In an embodiment, a UI-Cloud communication status and history may also be provided.

Embodiments described herein measure web application network performance, aggregate measures, and can alert a user in real time when issues arise. Data may also be pushed to an analytics ingestion system for aggregate-of-aggregate analytics and alerting which may also be used to view network performance across users and organizations. Unlike available tools offered by companies, such as NewRelic and Google (e.g., Google Analytics), embodiments described herein use and perform network analytics across multiple network interfaces instead of a default. For example, other web applications might monitor XMLHttpRequest (also known as 'XHR', 'REST', and 'HTTPS'). Solutions offered by a company such as NewRelic, do not expose metrics to the JavaScript page context, which is a problem because an app may want to display indicators or messaging to the user based on the various key performance indicators (KPIs). Embodiments described herein monitor not only XMLHttpRequest requests, but also Websockets and WebRTC (also known as 'RTCPeerConnection' and 'DTLS/SRTP/UDP') to measure network quality and performance. This is described in greater detail below.

While there are broadly four main categories of metrics that are useful for monitoring web applications (network performance, JavaScript/render performance, application events and logging, and user properties and behavior), network performance enables a user to know when, holistically, users are experiencing network latency to backend services. Thus, network performance is targeted for embodiments described herein. In monitoring sites, or individual users, it is useful for indicating client-side network issues. Network performance can also be measured from at least three angles, including XHR timing and status, Websocket stability, and WebRTC stats (RTCPeerConnection::getStats).

XmlHttpRequests can be monitored for latency and status codes. Generally, latency on XHR is easy to measure and a simple KPI to benchmark. Status codes can indicate problems that cannot be directly measured or known for sure. For example, a status code of '0' returned periodically from XHR possibly indicates that requests (or responses) are failing to make it through a firewall.

Websocket stability can also be monitored. Websockets are long lived Transport Layer Security (TLS) encrypted or Transmission Control Protocol (TCP) connections. Frequently closed websockets may be indicative of firewalls or other network utilities disrupting the socket connection. In general, websockets use the normal 443 port, but can still be broken by a firewall that has a maximum life on TLS/TCP connections.

Additionally, WebRTC stats (RTCPeerConnection) can be monitored as additional indicators of network issues. Interactive Connectivity Establishment (ICE) gathering comprises the gathering of IP/Port pairs for a client to make a DTLS/SRTP connection. If, when gathering, the client fails to find server-reflexive (SRVFLX) candidates, the user may be behind a symmetric NAT or that the STUN port is blocked. Latency in gathering ICE candidates could indicate a problematic network interface (like a VPN) where STUN packets are timing out, or more generally, latency on the network. Once the DTLS/SRTP connection is established, media statistics can be gathered. These are gathered by a browser through locally measured statistics and remote statistics delivered through RTCP. These stats can indicate latency (high Round Trip Time (RTT)), jitter, dropped packets, etc., which are useful in measuring the quality of the network for User Datagram Protocol (UDP) voice traffic. In some cases, WebRTC voice traffic is entirely local, whereas XR and websockets terminate in the cloud computing service. Connection interruptions and/or terminations for WebRTC connections can indicate that firewalls are not respecting keepalives or binding indications and are changing/dropping ports during a call.

Figure 1:
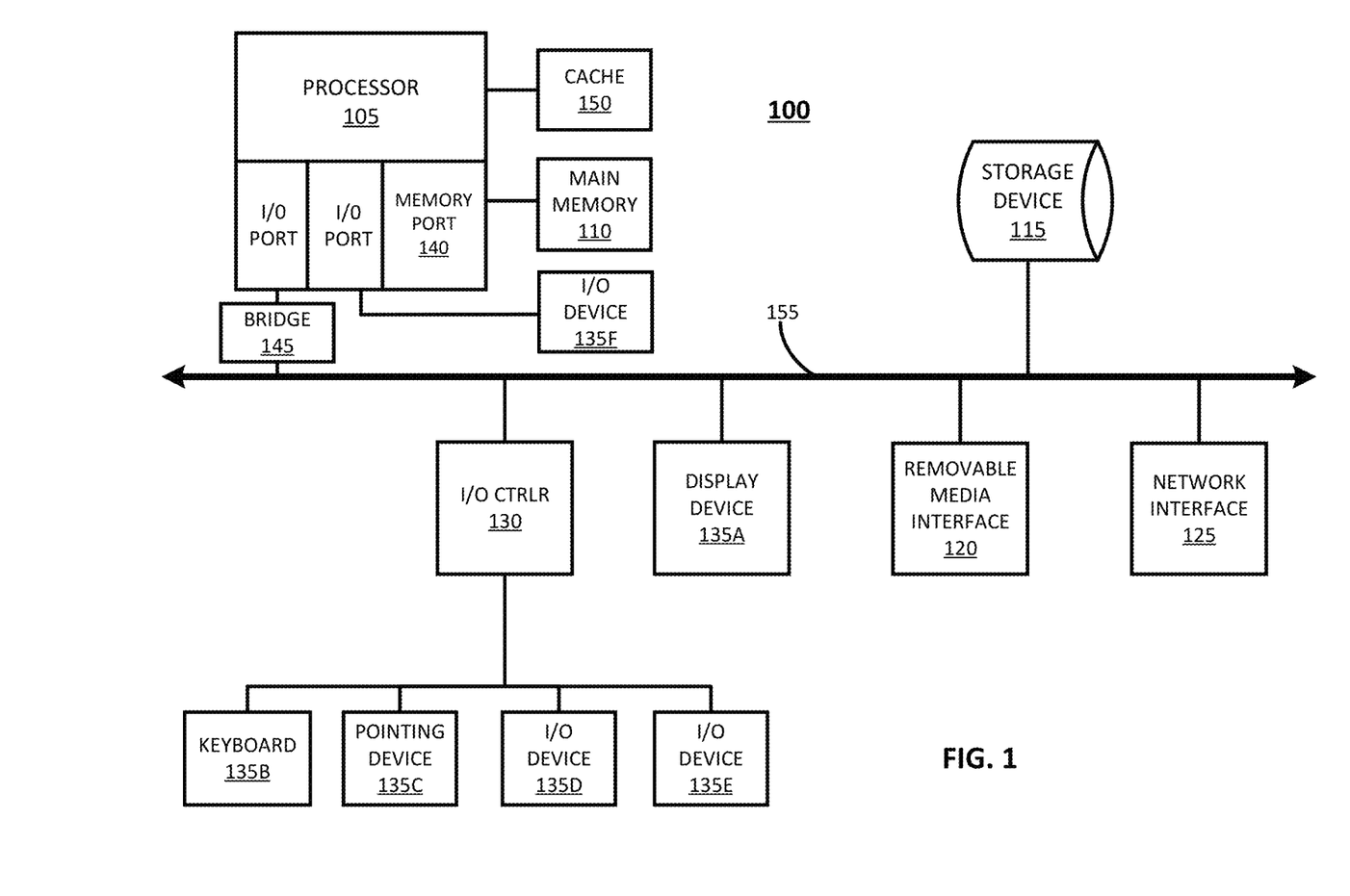
FIG. 1 depicts a schematic block diagram of a computing device in accordance with exemplary embodiments of the present invention and/or with which exemplary embodiments of the present invention may be enabled or practiced.

Turning now to FIG. 1, a schematic block diagram of an exemplary computing device 100 is shown in accordance with embodiments of the present invention and/or with which exemplary embodiments of the present invention may be enabled or practiced. Those skilled in the art will recognize that the various systems and methods disclosed herein may be computer implemented using many different forms of data processing equipment, for example, digital microprocessors and associated memory executing appropriate software programs. It should therefore be appreciated that FIG. 1 is provided as a non-limiting example.

The computing device 100 may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. For example, the various servers may be a process or thread running on one or more processors of one or more computing devices 100, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 100 (i.e., on-site at the same physical location as the agents of the contact center), remote computing devices 100 (i.e., off-site or in a cloud-based or cloud computing environment, for example, in a remote data center connected via a network), or some combination thereof. In exemplary embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, or the like.

As shown in the illustrated example, the computing device 100 may include a central processing unit (CPU) or processor 105 and a main memory 110. The computing device 100 may also include a storage device 115, removable media interface 120, network interface 125, and one or more input/output (I/O) devices 135, which as depicted may include an I/O controller 130, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system and software that run on the computing device 100. The operating system may control scheduling tasks and access to system resources. Unless otherwise limited, the operating system and software may include any capable of performing the operations described herein, as would be appreciated by one of ordinary skill in the art.

As shown in the illustrated example, the computing device 100A may include a wide variety of I/O devices 135. As shown, a I/O controller 130 may be used to control one or more I/O devices. As shown, Input devices may include the keyboard 135B and pointing device 135C, which, for example, may be a mouse or optical pen. Output devices, for example, may include video display devices, speakers and printers. The I/O devices 135 and/or the I/O controller 130 may include suitable hardware and/or software for enabling for the use of multiple display devices. The computing device 100 may also support one or more removable media interfaces 120, such as a disk drive, USB port, or any other device suitable for reading data from or writing data to any type of computer readable media. The removable media interface 120, for example, may be used for installing software and programs.

The computing device 100 may be any workstation, desktop computer, laptop or notebook computer, server machine, virtual device, mobile telephone, smart phone, portable telecommunication device, media playing device, gaming system, mobile computing device, or any other type of computing, telecommunications or media device, without limitation, capable of performing the operations described herein. The computing device 100 may have several input devices with each having different processors and operating systems. The computing device 100 may include a mobile device that combines several devices, such as a mobile phone having a digital audio player or portable media player.

The computing device 100 may be one of a plurality of devices connected by a network or connect to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. As an example, a local machine may have the capacity to function as both a client node seeking access to resources provided by a server and as a server providing access to hosted resources for other clients. The network may be LAN or WAN links, broadband connections, wireless connections, or some combination thereof, with connections being established using appropriate communication protocols. The computing device 100 may communicate with other computing devices 100 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization are also contemplated, such as, for example, the network (e.g., via software defined networking) or functions (e.g., via network functions virtualization).

Figure 2:
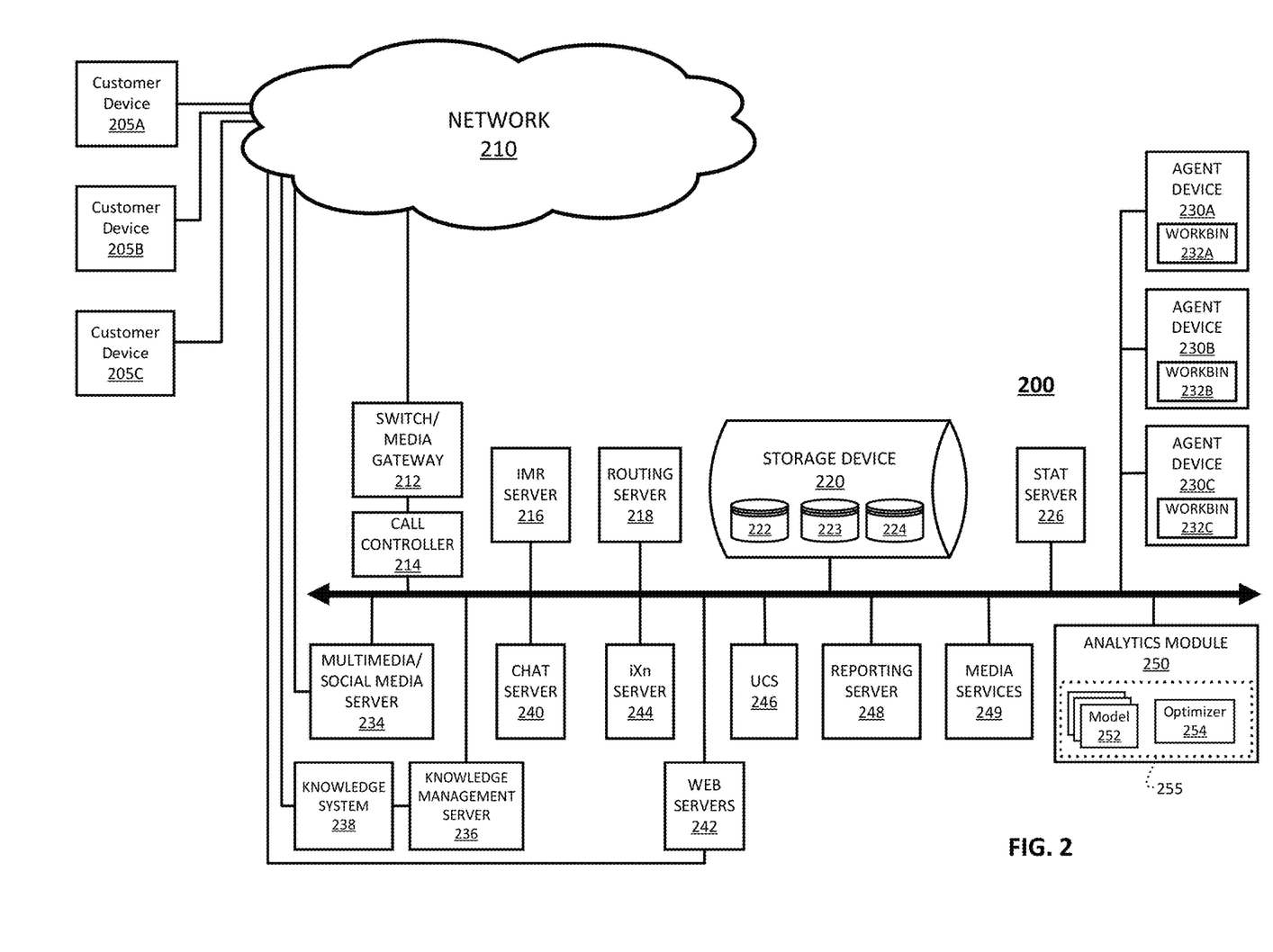
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality. In an embodiment, the cloud-based collaboration platform described herein comprises a software as a service (SaaS) that is a multi-tenant, microservices-based architecture and accessed over the Internet. The platform may be accessed from a user interface on the plurality of agent devices 230 as further described in FIG. 2 below.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Figure 3:
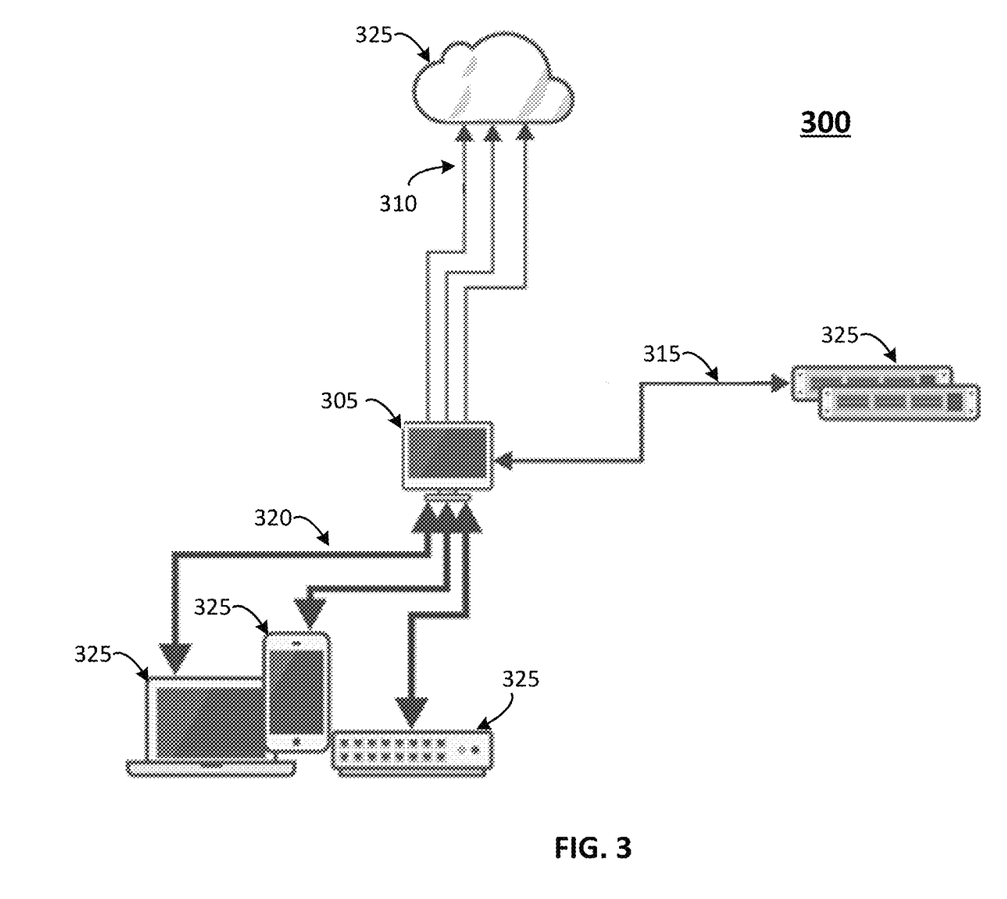
FIG. 3 depicts a schematic block diagram of network connectivity as an aggregate of metrics on a plurality of different connection types.

FIG. 3 depicts a schematic block diagram of network connectivity as an aggregate of metrics on a plurality of different connection types, indicated generally at 300. Embodiments described herein utilize a wrapping of native browser APIs to implement capture of metrics from the previously mentioned metrics sources. Wrapping of native APIs is not performed until an explicit invocation of the 'wrap' method. An 'unwrap' method is also provided in order to restore the native API, removing the wrapping API. The remote endpoints 325 of the connections from the central client 305 may be cloud services, including load balancers, public API gateways, etc. for connections 310, 315, and 320 or on-premises services. For connection 320, the remote endpoints may also comprise other clients.

As previously mentioned, applications measure network connectivity and performance by examining one of the illustrated network interfaces of web application clients. For example, NewRelic examines the REST/HTTPS/TLS (TCP) requests, performed in the browser via XMLHttpRequest. This examination is only performed in part as generally only response time is examined, not response time as a function of payload size. Other applications, such as Discord, may look at the Secure Real Time Protocol Streams (UDP or TCP) for streaming audio or video, performed in the browser via WebRTC (RTCPeerConnection and related APIs) for telemetry of streaming media. Embodiments described herein utilize telemetry of long-lived TLS (TCP) connections, performed in the browser via websockets for measuring network quality, connectivity or stability, in addition to examination of the other illustrated network interfaces. Measuring network quality/connectivity/stability by examining only one of the interfaces leaves a major gap in diagnosing the network as a whole. Through using an aggregate of the metrics on different connection types, one is able to diagnose lifetime-limits on TLS/TCP connections 315, diagnose bandwidth saturation of connection 320 as the cause of latency in connection 310, and dynamically shift application features to use a different connection type for functionality when one or more network connection types are problematic. By only examining the connection 310, it might appear that high latency is caused by a high round trip time for packets. However, in combination with the connection 320, it could be determined that high round trip time is the cause of latency or it could be shown that the network bandwidth is saturated.

XMLHttpRequests (XHR) are generally measured for their response time. This is an effective way to measure how long a request took to reach the server and return with a response. Web telemetry is used to measure this response time as a function of both the request body size and the response body size. This is useful in determining packet latency from bandwidth saturation. The metric can be augmented with metrics from SRTP/UDP streams, which provide separate metrics for packet round trip time (RTT) and bandwidth (bytes sent per time interval).

Web sockets are useful for monitoring network stability. By creating and opening a websocket, an application can determine when TLS/TCP interrupts occur on the network. This can be an indication of network failures in other features, such as XHR and media streams.

WebRTC streams provide information about network quality, configuration, and stability. Utilizing both built-in network metrics and RTCP, a client can determine RTT, bandwidth usage and availability, jitter, and interruptions.

Data can be combined from any of the above problems on the connections 410, 415, and 420 to isolate the problem to the network, as opposed to the ambiguity of traditional methods, which leave to be determined whether problems are caused by the network, client performance, or remote services. For example, a client 405 experiencing issues on two or three of the connection types has very little doubt the network is problematic.

Web telemetry uses the Apdex standard to score metrics. Each metric has an apdexT value, which indicates the threshold between a satisfactory value and a tolerable value.

The threshold between tolerable and frustrating is apdexT times four (4×apdexT). The apdex score is computed according to the following algorithm:

apdexScore=(count of satisfactory requests+half of the count of tolerable requests)/count of all requests Apdex T as applied to metrics yields the following:

| Metric | Units of apdexT |
| --- | --- |
| XHR Response time | milliseconds (ms) |
| XHR Response time as function of request/response size | ms/b |
| XHR aborted requests | unit (count) |
| WebSocket stability (lifetime of socket), for this metric, higher is better | Ms |
| WebRTC ICE gathering time | ms |
| WebRTC ICE failure rate | unit (count) |
| WebRTC ICE interrupts | unit (count) |
| UDP Packet Loss | percent per interval |
| UDP Jitter | ms |
| UDP Bitrate (higher is better) | kbps |
| UDP Round Trip Time | Ms |

The ability of a caller to successfully hear and respond to an agent is a core aspect of customer perception of a contact center's effectiveness and quality. When poor connections prevent successful interactions, callers become frustrated and outcomes are significantly affected. By adding the ability for agents to understand connection quality, the likelihood of an agent accepting a call which may not be successful or dropped is reduced. Information can also be gleaned about where the problem is related to the Saas platform or with the internet provider, internal network, etc.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for assessing connection quality for a first party in an interaction between the first party and a second party in a cloud-based collaboration platform, wherein the first party is associated with an enterprise that provides application features via the cloud-based collaboration platform, the method comprising the steps of:
   measuring web application network performance across a plurality of network connections between a central client and a plurality of endpoints to obtain a measurement for each network connection, wherein each of the plurality of network connections comprises a different connection type;
   aggregating the measurements obtained for each of the different connection types and analyzing for an issue;
   detecting an issue with a first connection type of the different connection types based on analysis of the aggregate of the measurements of the first connection type; and
   in response to detecting the issue, dynamically shifting at least one of the application features from network connections of the first connection type to network connections of one of the other connection types of the different connection types.

2. The method of claim 1, wherein the enterprise comprises a contact center and the first party comprises an agent of the contact center.

3. The method of claim 2, further comprising the steps of:
   alerting the first party in real-time of the detected issue; and
   receiving input from the first party that initiates the step of dynamically shifting the at least one of the application features from the network connections of the first connection type to the network connections of the one of the other connection types of the different connection types.

4. The method of claim 3, wherein the measuring further comprises analytics of XMLHttpRequests, Websockets, and WebRTC.

5. The method of claim 4, wherein the XMLHttpRequests are monitored for at least one of:
   latency in response time as a function of request body size and response body size; and
   status codes.

6. The method of claim 4, wherein the Websockets are monitored for frequent closures, wherein the closures are determined to be indicative of socket connection disruption.

7. The method of claim 6, wherein web telemetry is performed of TCP connections performed in a browser via the Websockets for measuring at least one of: network quality, network connectivity, and network stability.

8. The method of claim 4, wherein the WebRTC is monitored for one or more of:
   prior to connection, latency in gathering ICE candidates;
   after the connection, media statistics for latency, bandwidth usage and availability, jitter, and dropped packets;
   connection interruptions; and
   connection terminations.

9. The method of claim 8, wherein built-in network metrics and RTCPeerConnection are used to determine metrics for monitoring.

10. The method of claim 3, wherein the measuring further comprises analytics of two of: XMLHttpRequest requests, Websockets, and WebRTC.

11. The method of claim 3, wherein the measuring is performed using web telemetry; further comprising the steps of:
   pushing data to an analytics ingestion system for aggregate-of-aggregate analytics and alerting; and
   compiling analysis of network performance across users and organizations.

12. A system for assessing connection quality for a first party in an interaction between the first party and a second party in a cloud-based collaboration platform, wherein the first party is associated with an enterprise that provides application features via the cloud-based collaboration platform, the system comprising:
- a processor; and
- a memory in communication with the processor, the memory storing instructions that, when executed by the processor causes the processor to perform the steps of:
  - measuring web application network performance across a plurality of network connections between a central client and a plurality of endpoints to obtain a measurement for each network connection, wherein each of the plurality of network connections comprises a different connection type;
  - aggregating the measurements obtained for each of the different connection types and analyzing for an issue;
  - detecting an issue with a first connection type of the different connection types based on analysis of the aggregate of the measurements of the first connection type; and
  - in response to detecting the issue, dynamically shifting at least one of the application features from network connections of the first connection type to network connections of one of the other connection types of the different connection types.

13. The system of claim 12, wherein the enterprise comprises a contact center and the first party comprises an agent of the contact center.

14. The system of claim 13, wherein the memory stores additional instructions that, when executed by the processor further cause the processor to perform the steps of:
- alerting the first party in real-time of the detected issue; and
- receiving input from the first party that initiates the step of dynamically shifting the at least one of the application features from the network connections of the first connection type to the network connections of the one of the other connection types of the different connection types.

15. The system of claim 14, wherein the measuring further comprises analytics of XMLHttpRequests, Websockets, and WebRTC.

16. The system of claim 15, wherein the XMLHttpRequests are monitored for at least one of:
- latency in response time as a function of request body size and response body size; and
- status codes.

17. The system of claim 15, wherein the Websockets are monitored for frequent closures, wherein the closures are determined to be indicative of socket connection disruption.

18. The system of claim 17, wherein web telemetry is performed of TCP connections performed in a browser via the Websockets for measuring at least one of: network quality, network connectivity, and network stability.

19. The system of claim 15, wherein the WebRTC is monitored for one or more of:
- prior to connection, latency in gathering ICE candidates;
- after the connection, media statistics for latency, bandwidth usage and availability, jitter, and dropped packets;
- connection interruptions; and
- connection terminations.

20. The system of claim 19, wherein built-in network metrics and RTCPeerConnection are used to determine metrics for monitoring.

* * * * *